Patented Aug. 6, 1940

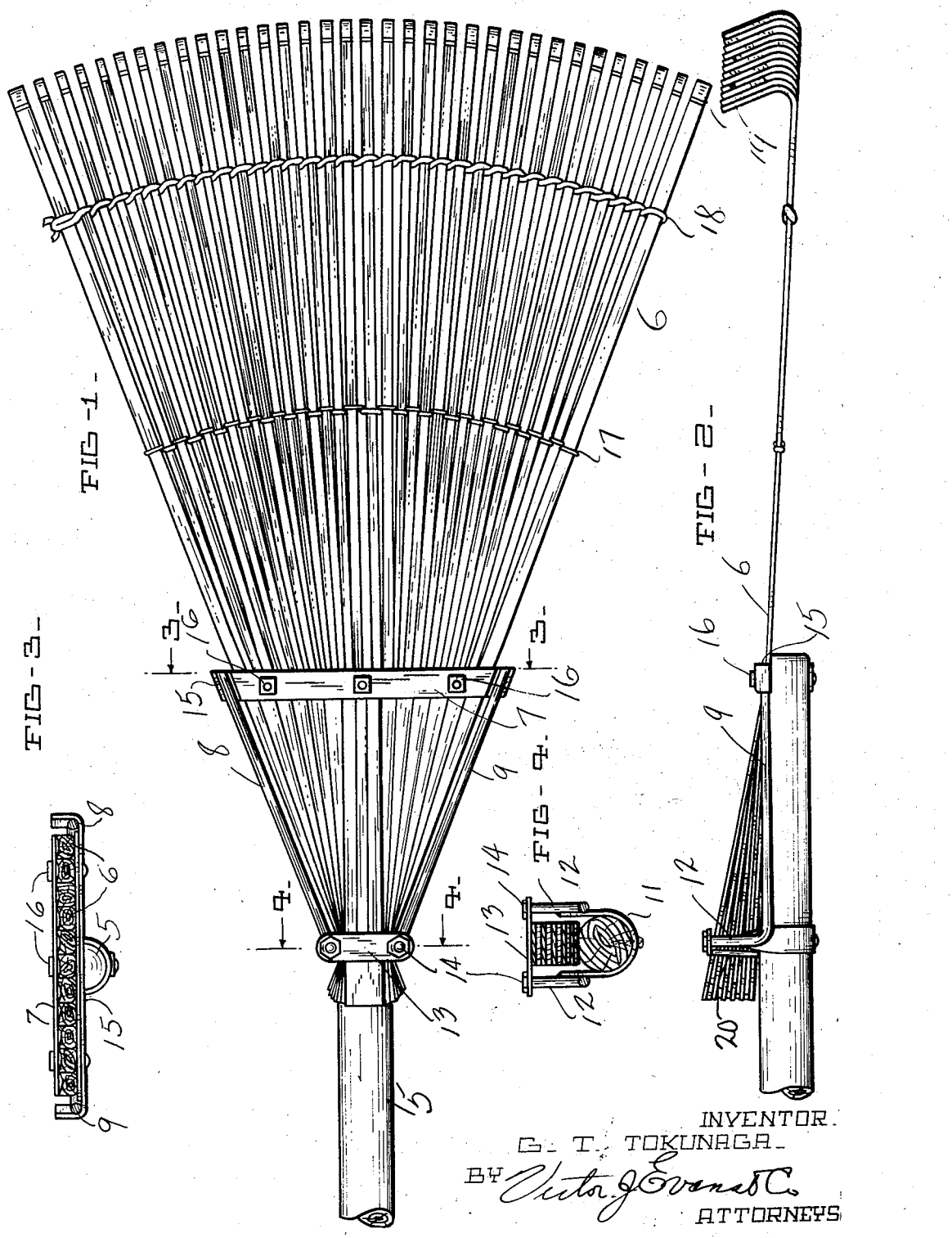

2,210,784

UNITED STATES PATENT OFFICE 2,210,784

RAKE

George T. Tokunaga, San Francisco, Calif.

Application June 6, 1938, Serial No. 212,168

1 Claim. (Cl. 56—400.17)

This invention relates to improvements in rakes, and has particular reference to that type of rake known as a bamboo rake used in garden work and is particularly adapted to raking leaves from a lawn.

The primary object of the invention is to provide novel means for connecting the relatively flexible tines to the frame to thus prevent accidental displacement of the said tines from the frame.

A further object of the invention is the provision of cushioning means to thus prolong the life of the tines by eliminating danger of breakage.

Another object of the invention is to provide means whereby the tines may be individually inserted or removed, so that the rake may be kept in repair at all times.

An additional object of the invention is to produce a rake of this character that is economical in manufacture, strong, durable and highly efficient.

Other objects and advantages will be apparent during the course of the following description.

In the accompanying drawing forming a part of this specification and in which like numerals are employed to designate like parts throughout the same:

Fig. 1 is a plan view of the rake constructed in accordance with my invention;

Fig. 2 is a side elevation of the same;

Fig. 3 is a horizontal section taken through the rake on the line 3—3 of Fig. 1; and Fig. 4 is a transverse section on the line 4—4 of Fig. 1.

Bamboo rakes have become exceedingly popular in use on lawns and in flower gardens because of the flexible construction of the tines and teeth, so that while a positive raking action can be accomplished, nevertheless, delicate plants will not be injured by contact therewith of the flexible tines, as they would be were an iron rake employed. The tines, however, are sometimes subjected to undue strain, and are consequently broken, and when a plurality of the teeth or tines become boken the rake becomes practically useless. To, therefore, provide a compact arrangement of a rake wherein the tines may be readily replaced, if desired, and to assure a rake that is most durable and readily assembled, I have devised the present construction, wherein the numeral 5 designates the handle of the rake, and the numeral 6 designates as a whole the spaced tines of the rake. The said handle 5 is secured at two points to the tines of the rake by virtue of a unique arrangement of a cross plate and a clamp. The said cross plate is indicated by the numeral 15, and is flanged at its respective ends to provide a means for securing the ends of a pair of diverging rods 8 and 9, the spaced ends of the rods being preferably soldered to a clamp 11 adapted to straddle a portion of the rake handle. It will be noted that the said rods are upwardly bent as at 12, and are equipped with threaded ends adapted to penetrate a plate 13 and in turn being secured to said plate through the medium of locking nuts 14. Positioned in parallelism to the plate 13 and on the same side of the rake tines and in alignment with the cross plate 15 is a metallic clamping plate 7 that is secured to said cross plate through the medium of bolts or the like 16. The bolts are adapted to pass between certain of the spaced tines 6.

For the purpose of properly spacing the tines and at the same time providing a compact arrangement of the rake structure, I propose to secure the tines in a fixed position by the employment of an interlocking wire 17 and an interlocking cord 18 that is positioned adjacent the down turned ends 19 of the tines to provide arcuately arranged braces for said tines.

In the assembly of the device the respective inner ends of the tines are positioned one on top of the other, as illustrated to advantage in Fig. 2 of the drawing, and are clamped or locked together by the use of a twisted wire 20, and to further effect a positive securing of the ends of the tines in position beneath the plate 13, I propose to insert a screw through the clamp 11 and to have the inner end of the screw penetrate the handle 5.

The cross sectional view shown in Figure 3 includes the handle 5, the tines 6, the side rods 8 and 9 which rods together with the plates 7 and 13 form a substantially triangular shaped supporting frame to hold the tines in rigid position, and it will also be noted that a cushioning strip may be inserted between the cross plate 15 and the tines.

From the foregoing description considered in connection with the accompanying drawing, it will be obvious that I have produced a device that is a unique arrangement of a bamboo rake, wherein the objects defined are readily accomplished.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A device of the character described, a handle, a tine carrying frame consisting of a cross plate, means for securing a handle to the lower face thereof intermediate its ends, upwardly extending lugs carried by the ends of said cross plate, a bar secured to each of said lugs and rearwardly converging, upwardly extending members carried by the rear ends of the bars and having their upper ends threaded, a handle engaging member secured between the upwardly turned ends of the bars, tines on said cross plate between the lugs and having their inner ends superimposed upon the handle between the upwardly extending members of the bars, a clamping plate having openings receiving the threaded ends of the bars, and nuts for clamping the superimposed ends of the tines on the handle, and a cross member between the lugs of the cross plate for clamping the tines thereon.

GEORGE T. TOKUNAGA.